(12) United States Patent
Tsai

(10) Patent No.: US 7,702,933 B2
(45) Date of Patent: Apr. 20, 2010

(54) MULTIPROCESSOR POWER-ON SWITCH CIRCUIT

(75) Inventor: Sheng-Yuan Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 751 days.

(21) Appl. No.: 11/699,548

(22) Filed: Jan. 30, 2007

(65) Prior Publication Data
US 2008/0184043 A1    Jul. 31, 2008

(51) Int. Cl.
*G06F 1/26* (2006.01)
(52) U.S. Cl. .................. 713/300; 713/330; 713/340; 714/11; 714/25; 714/47
(58) Field of Classification Search .............. 713/300, 713/330, 340; 714/11, 25, 47
See application file for complete search history.

(56) References Cited
U.S. PATENT DOCUMENTS
4,817,091 A * 3/1989 Katzman et al. ............... 714/8
6,492,850 B2 * 12/2002 Kato et al. .................. 327/143
7,265,605 B1 * 9/2007 Vasudevan .................. 327/534

* cited by examiner

Primary Examiner—Thuan N Du
(74) Attorney, Agent, or Firm—Rabin & Berdo, P.C.

(57) ABSTRACT

A multiprocessor power-on switch circuit applied to a mainboard having multiple power-on circuits is provided, in which each power-on circuit includes a peripheral circuit corresponding to a processor. A selection circuit in the power-on switch circuit is responsible for selecting a power-on circuit as a first power-on circuit or a second power-on circuit. When the mainboard is powered on, a detection circuit in the power-on switch circuit receives a status signal from the first power-on circuit performing the power-on action. When the status signal is determined as a fault signal by the detection circuit, a control signal is output to the selection circuit, so as to make the selection circuit set the second power-on circuit as the power-on circuit to actuate the mainboard.

5 Claims, 3 Drawing Sheets

MULTIPROCESSOR POWER-ON SWITCH CIRCUIT

BACKGROUND OF THE INVENTION

1. Field of Invention

The present invention relates to a multiprocessor power-on switch circuit, and more particularly to a multiprocessor power-on switch circuit using a selection circuit to switch power-on circuits.

2. Related Art

It becomes more and more difficult to improve the operating and processing capacity of a processor simply with the current techniques, and thus many manufacturers producing processors resort to develop the parallel processing technology for multiple processors, so as to enhance the operating and processing capacity of a computer (especially a server). In addition to a computer, the technique of multiprocessor can be used in almost all the operating devices, such as personal digital assistant and digital television.

If a computer employs multiprocessor, more than one processor is disposed on the mainboard. Although the number of the processor has changed from one to several, only one processor is required to perform the power-on action when needed, and the processor for performing power-on is a pre-determined one of the processors.

A current multiprocessor mainboard circuit has two architectures: one is multiple processors used together with a set of peripheral circuits, the other is multiple processors used together with multiple sets of peripheral circuits and each processor has a special set of peripheral circuits. The mainboard in which multiple processors share a set of peripheral circuits is now able to cope with the situation that the processor performing the power-on action fails according to various processing mechanisms. However, currently, as the multiple processors use the respective peripheral circuit architecture individually, when the processor for power-on or the peripheral circuit thereof fails, the mainboard has no corresponding processing mechanism, and the mainboard cannot automatically switch to other processors and peripheral circuits to perform the power-on action, even if more than one processor and peripheral circuit that can operate normally are disposed thereon, thus making the whole computer completely unusable.

Therefore, it becomes an issue to be solved urgently that, how to provide a function to automatically switch to other processors to perform the power-on action when the processor for performing the power-on action or the peripheral circuit thereof fails.

SUMMARY OF THE INVENTION

In view of the above problem, the present invention is directed to provide a multiprocessor power-on switch circuit, in which it is determined whether a status signal transmitted from the power-on circuit is a fault signal via a detection circuit when powered on, a selection circuit is provided to select a power-on circuit for start-up, and the selected power-on circuit is used by a basic input/output system (BIOS) to actuate the mainboard, so as to switch to other power-on circuits to perform the power-on action when the power-on circuit comprising the processor and the peripheral circuit thereof fails, thereby solving the problem mentioned in the prior art.

As embodied and broadly described herein, the power-on switch circuit disclosed in the present invention comprises a first power-on circuit having a first processor and a first peripheral circuit, a second power-on circuit having a second processor and a second peripheral circuit, a selection circuit for switching the power-on circuit to perform the power-on action, and a detection circuit for detecting whether the power-on circuit fails.

The detailed features and practice of the present invention will be described in detail below in the embodiments with the accompanying drawings. Those skilled in the arts can easily understand and implementation the content of the present invention. Furthermore, the relative objectives and advantages of the present invention are apparent to those skilled in the arts with reference to the content disclosed in the specification, claims, and drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
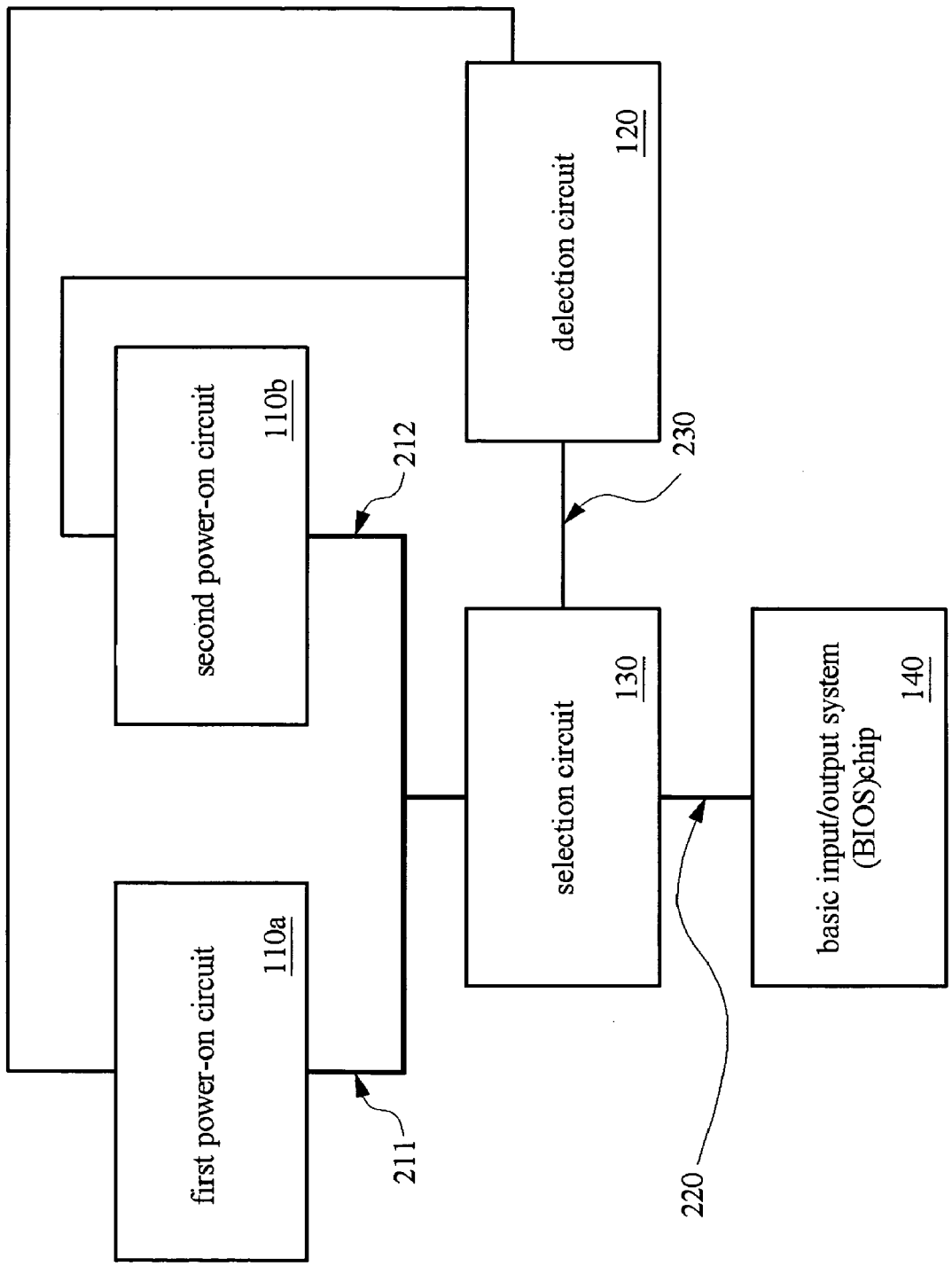
FIG. 1A is a schematic circuit diagram of the multiprocessor power-on switch circuit according to the present invention.
Figure 1B:
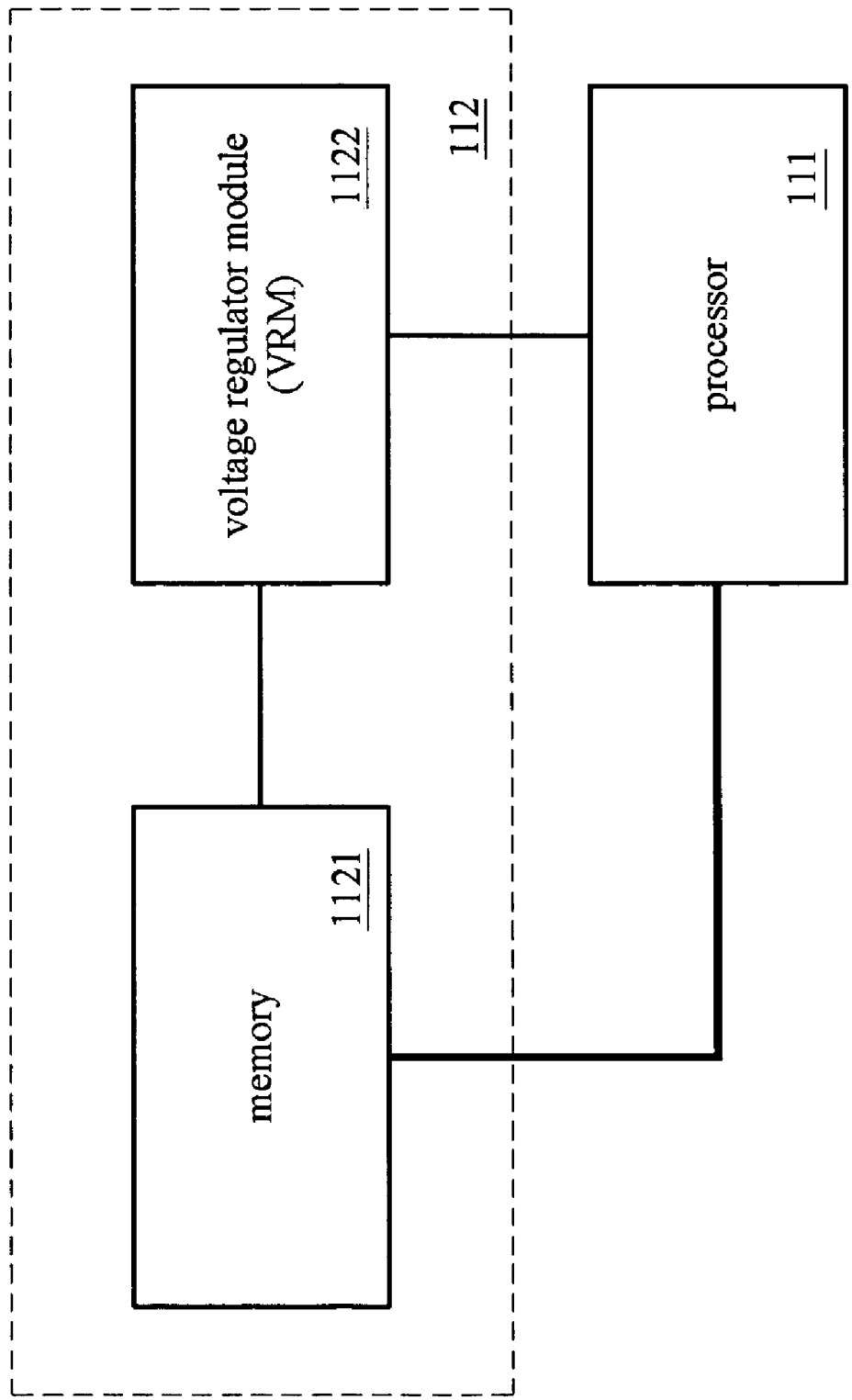
FIG. 1B is a schematic circuit diagram of the power-on circuit according to the present invention.

Referring to FIG. 1A, a schematic circuit diagram of the multiprocessor power-on switch circuit of the present invention is shown for illustrating the operation thereof. As shown in the figure, the power-on switch circuit of the present invention includes a first power-on circuit 110a, a second power-on circuit 110b, a detection circuit 120, and a selection circuit 130. The first power-on circuit 110a and the second power-on circuit 110b are respectively coupled to the detection circuit 120 and the selection circuit 130, for actuating the mainboard. The detection circuit 120 is coupled to the first power-on circuit 110a, the second power-on circuit 110b, and the selection circuit 130, for receiving a status signal from the first power-on circuit 110a performing the power-on action, generating a control signal based on whether the status signal is a fault signal, and then transmitting the control signal to the selection circuit 130. The selection circuit 130 is coupled to the first power-on circuit 110a, the second power-on circuit 110b, the detection circuit 120, and a BIOS chip 140, for selecting the first power-on circuit 110a or the second power-on circuit 110b for the BIOS in the BIOS chip 140 to power on the mainboard once receiving the control signal transmitted from the detection circuit 120. As shown in FIG. 1B, the first power-on circuit 110a and the second power-on circuit 110b respectively have a processor 111 and a peripheral circuit 112 of the processor 111, in which the peripheral circuit 112 includes a memory 1121, and a voltage regulator module (VRM) 1122 for controlling the working voltage of the processor 111.

Then, the operation of the present invention is illustrated by an embodiment. The detection circuit 120 in this embodiment is, but not limited to, a programmable array logic (PAL) chip, and for example, the same efficacy can be achieved by using a logic circuit consisting of basic electronic elements. The selection circuit 130 in this embodiment is, but not limited to, a differential signal selection chip, and for example, any circuits or chips that can receive two sets of buses of power-on circuits and switch to output the signal of one set of the buses through more than one selection lines can be applied in the present invention.

As shown in FIG. 1A, two sets of power-on circuits, i.e., the first power-on circuit 110a and the second power-on circuit 110b, are disposed on the mainboard. The first power-on circuit 110a is connected to the differential signal selection chip 130 via a first bus 211, the second power-on circuit 110b is connected to the differential signal selection chip 130 via a second bus 212, and the first power-on circuit 110a and the second power-on circuit 110b are respectively connected to different pins on the differential signal selection chip 130. For the current architecture, the first power-on circuit 110a and the second power-on circuit 110b each require sixteen pins to be connected to the differential signal selection chip 130. Moreover, the differential signal selection chip further has a selection line 230, and thus the differential signal selection chip 130 can control the signal transmission route according to the signal (1 or 0) on the selection line 230, such that the signal can be transmitted on the first bus 211 and a third bus 220 or on the second bus 212 and the third bus 220.

When powering on the mainboard, if the first power-on circuit 110a is preset to perform the power-on action, the PAL chip 120 receives a status signal from the first power-on circuit 110a. If the status signal from the first power-on circuit 110 (for example, a signal of the. CPU, memory, or VRM) is normal, the PAL chip 120 transmits a control signal of "0" to the differential signal selection chip through the selection line 230, and the differential signal selection chip thus conducts the first bus 211 and the third bus 220 accordingly, such that an electric signal can be transmitted between the first power-on circuit 110a and the BIOS chip 140.

If the status signal of the first power-on circuit 110a is abnormal, for example, the PAL chip receives an abnormal signal of the CPU, memory, or VRM, which indicates that a failure occurs to the first power-on circuit 110a, the PAL chip outputs a control signal "1" to the selection line 230 after being determined by a program. After the differential signal selection chip receives the control signal "1" from the selection line 230, an electric signal is allowed to be transmitted between the second bus 212 and the third bus 220 accordingly. That is, the differential signal selection chip switches the power-on circuit for actuating the mainboard from the first power-on circuit 110a to the second power-on circuit 110b, such that the BIOS in the BIOS chip 140 is set to use the peripheral devices on the second power-on circuit 110b, and thus the mainboard can be powered on by the second power-on circuit 110b. Therefore, the problem that the mainboard cannot be powered on when the power-on circuit for performing the power-on action fails is solved by the present invention.

Figure 2:
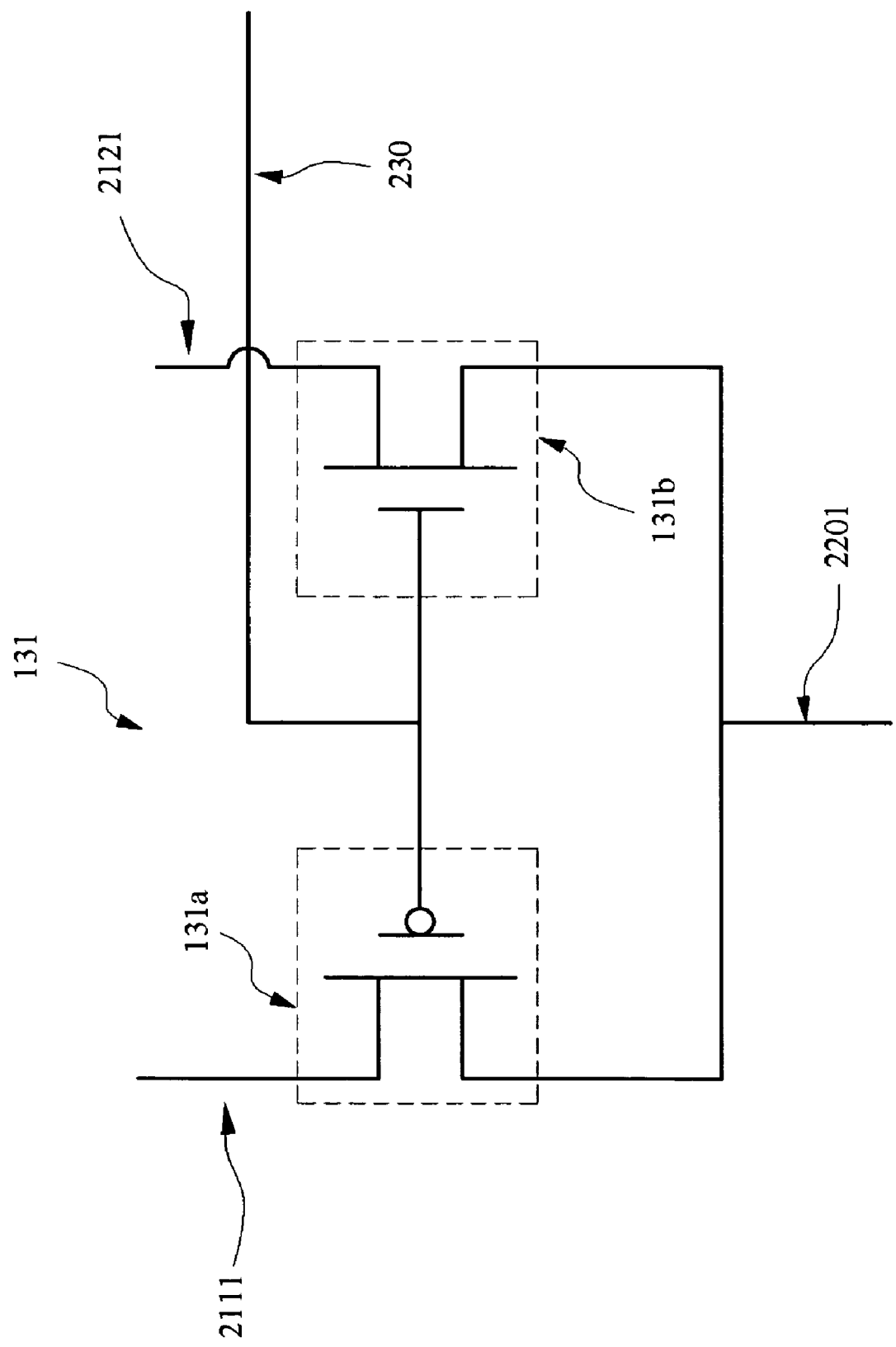
FIG. 2 is a schematic circuit diagram of the selector of the selection circuit according to the present invention.

The selection circuit 130 of the present invention may have selectors 131 of the same number as the signal lines in the first and second buses 211, 212. As shown in FIG. 2, when the control signal on the selection line 230 is "0", the selectors 131 allow a first transistor 131 a to conduct a first signal line 2111 in the first bus 211 and a third signal line 2201 in the third bus 220, and meanwhile prevent the second transistor 131b from conducting a second signal line 2121 in the second bus 212 and the third signal line 2201. Thus, after passing through the selectors 131, all the signal lines in the first bus 211 are connected with the third bus 220, such that an electric signal can be transmitted between the first bus 211 and the third bus 220. When the control signal on the selection line 230 is "1", the selectors 131 prevent the first transistor 131 a from conducting the first signal line 2111 and the third signal line 2201, and meanwhile allow the second transistor 131b to conduct the second signal line 2121 and the third signal line 2201. Thus, after passing through the selectors 131, all the signal lines in the second bus 212 are connected with the third bus 220, such that an electric signal can be transmitted between the second bus 212 and the third bus 220, thereby achieving the desired efficacy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiprocessor power-on switch circuit applied to a mainboard, comprising:
   a first power-on circuit, having a first processor and a first peripheral circuit corresponding to the first processor;
   a second power-on circuit, having a second processor and a second peripheral circuit corresponding to the second processor;
   a detection circuit, coupled to a selection circuit and the first power-on circuit, for receiving a status signal from the first power-on circuit upon power-on of the mainboard, and outputting a control signal when the status signal is determined as a fault signal; and
   the selection circuit, for receiving the control signal, and selecting the first power-on circuit or the second power-on circuit to actuate the mainboard according to the control signal.

2. The multiprocessor power-on switch circuit as claimed in claim 1, wherein the first peripheral circuit comprises a memory and a voltage regulator module (VRM).

3. The multiprocessor power-on switch circuit as claimed in claim 1, wherein the second peripheral circuit comprises a memory and a VRM.

4. The multiprocessor power-on switch circuit as claimed in claim 1, wherein the selection circuit is a differential signal selection chip.

5. The multiprocessor power-on switch circuit as claimed in claim 1, wherein the detection circuit is a programmable array logic (PAL) chip.

* * * * *